(12) United States Patent
Deflaux et al.

(10) Patent No.: US 7,730,034 B1
(45) Date of Patent: Jun. 1, 2010

(54) PROVIDING ENTITY-RELATED DATA STORAGE ON HETEROGENEOUS DATA REPOSITORIES

(75) Inventors: Nicole A. Deflaux, Seattle, WA (US); Vidya V. Iyer, Seattle, WA (US); James C. Willeford, Seattle, WA (US); Adam D. Bradley, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 362 days.

(21) Appl. No.: 11/780,323

(22) Filed: Jul. 19, 2007

(51) Int. Cl.
*G06F 17/30* (2006.01)
(52) U.S. Cl. .................... 707/654; 705/9; 711/161; 711/162
(58) Field of Classification Search ............... 707/204; 705/9; 711/161, 162
See application file for complete search history.

(56) References Cited

U.S. PATENT DOCUMENTS

| | | | | |
|---|---|---|---|---|
| 5,970,490 | A * | 10/1999 | Morgenstern | 707/10 |
| 7,251,693 | B2 * | 7/2007 | Stull et al. | 709/225 |
| 2005/0198352 | A1 * | 9/2005 | Fleck et al. | 709/232 |
| 2006/0106675 | A1 * | 5/2006 | Cohen et al. | 705/26 |
| 2007/0005665 | A1 * | 1/2007 | Vaitzblit et al. | 707/202 |
| 2008/0082542 | A1 * | 4/2008 | Cohen et al. | 707/10 |

OTHER PUBLICATIONS

"The Chord/DHash Project—Chord FAQ" retrieved Jul. 17, 2007, from http://pdos.csail.mit.edu/chord/faq.html, 4 pages.
"The Chord/DHash Project—Overview" retrieved Jul. 17, 2007, from http://pdos.csail.mit.edu/chord/, 1 page.
"What is an Entity Bean?" The J2EE™ Tutorial, retrieved Jul. 17, 2007, from http://java.sun.com/j2ee/tutorial/1_3-fcs/doc/EJBConcepts4.html, 4 pages.
Carbonado, homepage, retrieved Jul. 17, 2007, from http://carbonado.sourceforge.net, 3 pages.
Cecchet, E., et al., "C-JDBC: Flexible Database Clustering Middleware," Mar. 2005, ObjectWeb, retrieved Jul. 17, 2007, from http://c-jdbc.objectweb.org/current/doc/C-JDBC_Flexible_Database_Clustering_Middleware.pdf, 10 pages.

(Continued)

*Primary Examiner*—Hosain T Alam
*Assistant Examiner*—Jieying Tang
(74) *Attorney, Agent, or Firm*—Seed IP Law Group

(57) ABSTRACT

Techniques are described for storing and accessing data on heterogeneous types of data repositories, such as by a distributed software system that uses multiple data repositories on multiple computing nodes, including to transfer groups of data between multiple heterogeneous types of data repositories. In some situations, the techniques may be used by a system that stores various types of data regarding users or other entities that are modeled by the system, such as to transfer a group of data that represents an entity. The transfer of data may be facilitated by use of an abstraction interface that provides a uniform interface for accessing the multiple data repository types, such as an abstraction interface provided by one or more storage management components that further provide functionality to translate data between various data formats used by the multiple data repository types, such as via use of a common data format.

52 Claims, 5 Drawing Sheets

OTHER PUBLICATIONS

Chen, P., "The Entity-Relationship Model—Toward a Unified View of Data," Mar. 1976, *ACM Transactions on Database Systems* 1(1):9-36, retrieved Jul. 17, 2007, from http://bit.csc.lsu.edu/~chen/pdf/erd.pdf, 28 pages.

Hibernate.org, Relational Persistence for Java and .NET, retrieved Jul. 17, 2007, from http://www.hibernate.org/, 3 pages.

Hibernate.org, Product Evaluation FAQ, retrieved Jul. 17, 2007, from http://www.hibernate.org/263.html, 4 pages.

JBoss.com, "Object and Relational Mapping (ORM) with Hibernate," retrieved Jul. 17, 2007, from http://www.jboss.com/pdf/HibernateBrochure-Jun2005.pdf, 4 pages.

Karger, D., et al., "Consistent Hashing and Random Trees: Distributed Caching Protocols for Relieving Hot Spots on the World Wide Web," May 1997, (ACM) Symposium on Theory of Computing, retrieved Jun. 19, 2007, from http://citeseer.ist.psu.edu/cache/papers/cs/2895/http:zSzzSztheory.lcs.mit.eduzSz~kargerzSzPaperszSzweb.pdf/karger97consistent.pdf, 10 pages.

ObjectWeb.org, Homepage, retrieved Jul. 17, 2007, from http://c-jdbc.objectweb.org/, 2 pages.

ObjectWeb.org, "C-JDBC: Scalability and High Availability for your Database," Jan. 2006, retrieved Jul. 17, 2007, from http://c-jdbc.objectweb.org/current/doc/C-JDBC-Brochure-EN.pdf, 2 pages.

ObjectWeb.org, How does it Work?,, retrieved Jul. 17, 2007, from http://c-jdbc.objectweb.org/howdoesitwork.html, 1 page.

Wikipedia, "Object-relational Mapping," retrieved Jul. 17, 2007, from http://en.wikipedia.org/wiki/Object-relational mapping, 4 pages.

\* cited by examiner

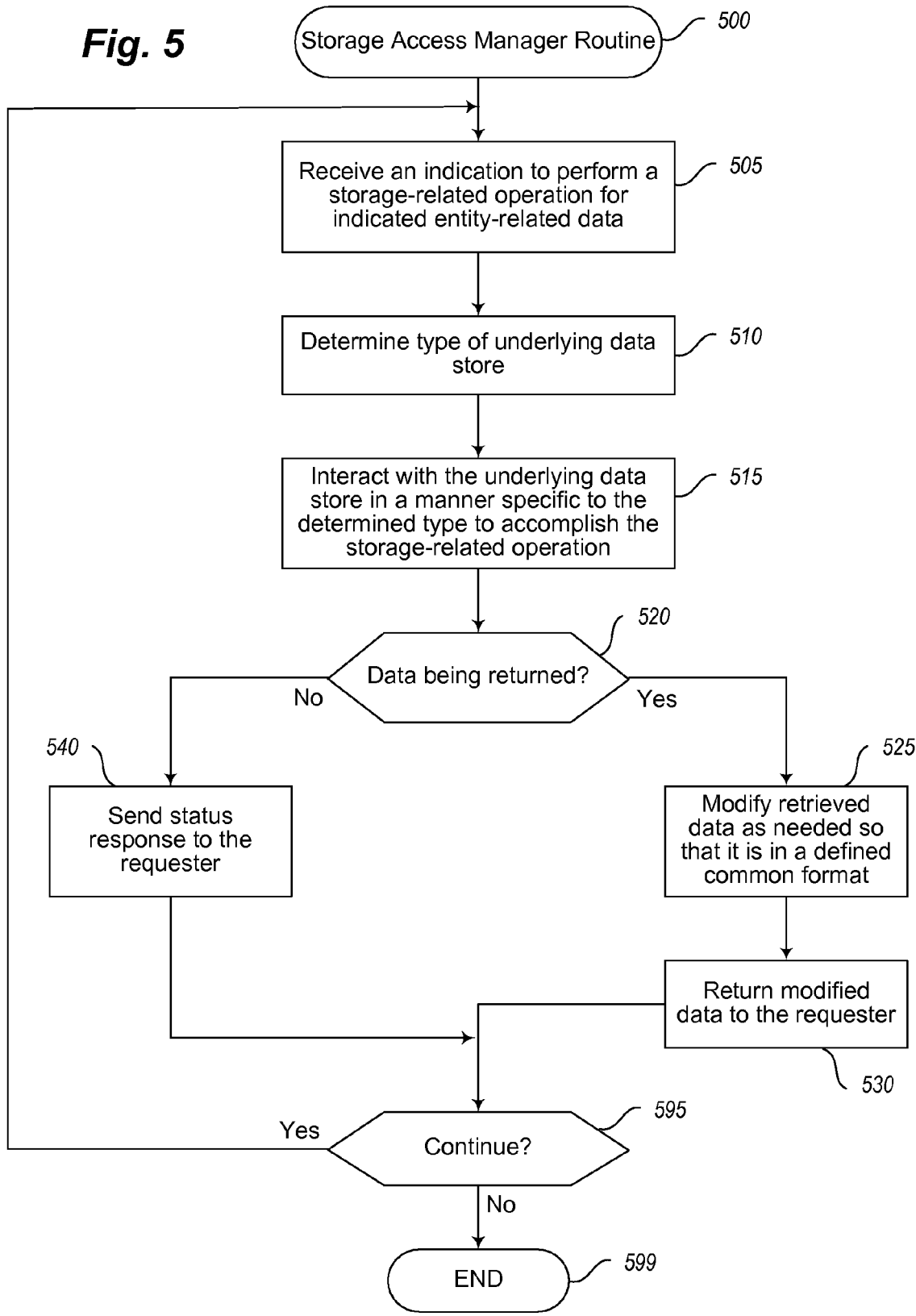

PROVIDING ENTITY-RELATED DATA STORAGE ON HETEROGENEOUS DATA REPOSITORIES

TECHNICAL FIELD

The following disclosure relates generally to providing storage of data related to entities on heterogeneous types of data repositories.

BACKGROUND

As the use of the Internet and the World Wide Web ("Web") has become widespread, it is increasingly common for users to access and use various types of capabilities provided by remote computing systems over the Web, including to search for, shop for and order items (such as products, services and/or information) that are for purchase, rent, lease, license, trade, evaluation, sampling, subscription to, etc. In addition to such user-initiated interactions, software programs on remote computing systems may also interact for various purposes and in various ways. For example, there is growing use of the Web to provide so-called "Web services," which typically involve the programmatic interaction of remote applications to exchange information via defined APIs ("application program interfaces"). Web services allow heterogeneous applications and computers to interact, and may be defined and implemented using a variety of underlying protocols and techniques. For example, some Web service implementations return data in XML ("eXtensible Markup Language") format using HTTP ("HyperText Transport Protocol") in response to a Web service invocation request specified as a URI ("Uniform Resource Identifier"), such as a URL ("Uniform Resource Locator") that includes a specified operation and one or more query parameters. Such URI-based invocation requests may, for example, be based on the use of XML over HTTP (e.g., as part of the REpresentational State Transfer, or "REST", distributed interaction model that focuses on resources). In other implementations, additional underlying protocols are used for various purposes, such as SOAP ("Simple Object Access Protocol") for standard message exchange, WSDL ("Web Services Description Language") for description of service invocations, and UDDI ("Universal Description, Discovery, and Integration service") for discovery of available services.

While the use of services to provide various capabilities to remote users and other clients may result in various benefits, various problems also exist. For example, as the scale of such offerings increases (e.g., to support large numbers of clients), large numbers of computing devices may be needed to store data related to interactions with the clients. However, among other potential issues, it can be difficult to manage the storage of data in such situations. For example, if only a single type of data storage system is used by all of the computing devices that support a system, it may restrict the ability to scale the system, as well as inhibit the ability to modify the system over time. Conversely, if a system attempts to support the use of multiple types of data storage systems, it can greatly enhance the complexity of the system, since each distinct type of data storage system will typically store data in a distinct internal format and will provide a distinct interface for accessing stored data.

BRIEF DESCRIPTION OF THE DRAWINGS

FIG. 5 illustrates a flow diagram of an example embodiment of a Storage Access Manager routine.

DETAILED DESCRIPTION

Figure 1:
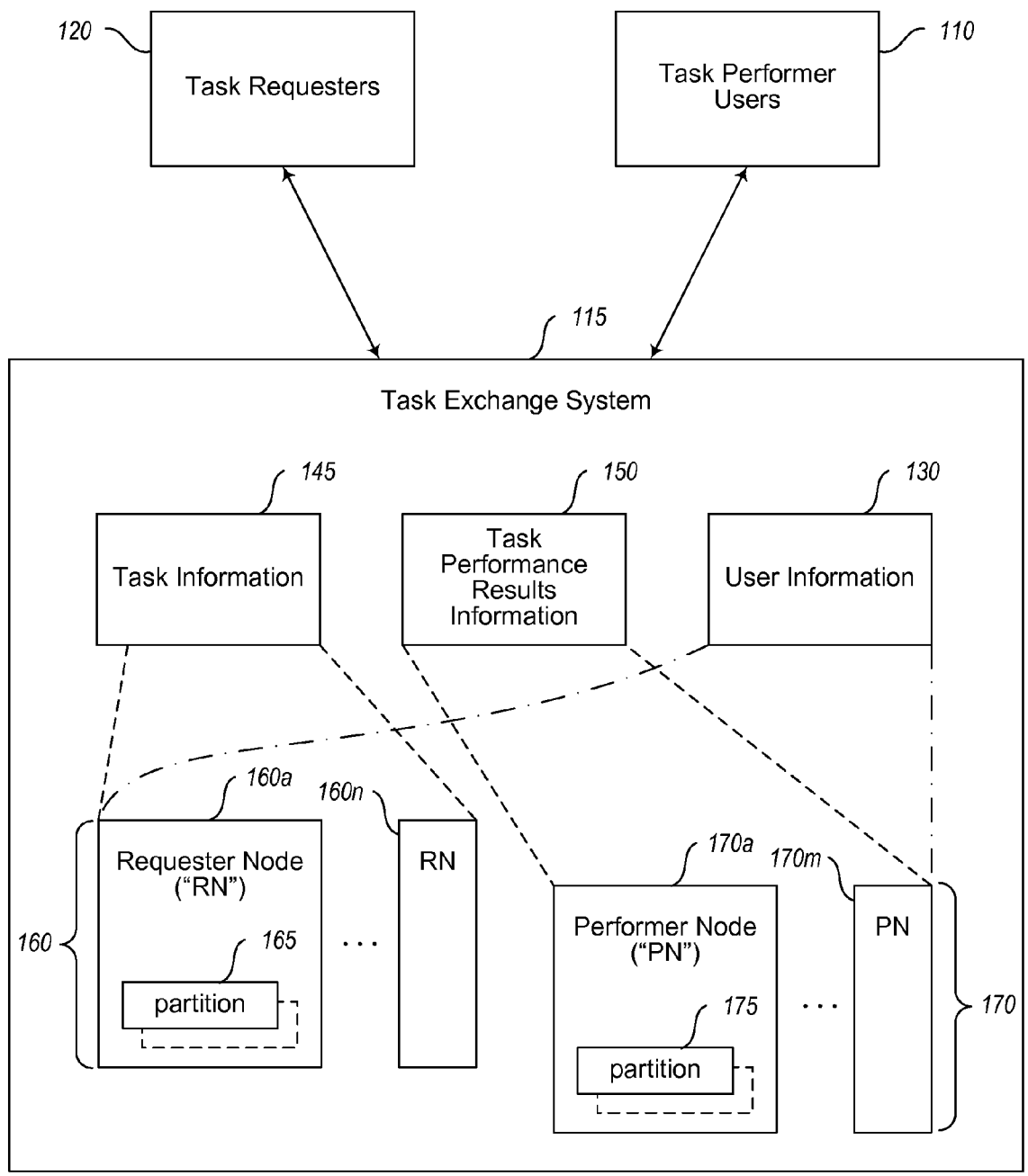
FIG. 1 is a network diagram illustrating an example of users interacting with a remote system that stores various data and provides various types of functionality.

Techniques are described for, among other things, storing and accessing data on heterogeneous types of data repositories, such as by a distributed software system that uses multiple data repositories on multiple computing nodes. In at least some embodiments, the described techniques include transferring groups of data between multiple heterogeneous types of data repositories that are provided by distinct computing nodes. For example, a particular group of data of interest may currently be stored on a first data repository of a first type in a first data format specific to the first type (e.g., in rows of tables for an SQL-based relational database, as part of one or more files in a flat file database, etc.), and may be desired to be transferred to a second data repository of a distinct second type that stores data in a second data format specific to the second type.

In at least some embodiments, the transfer of the group of data is facilitated by use of an abstraction interface that provides a uniform interface for accessing the multiple data repository types, such as an abstraction interface provided by one or more storage management components operating in conjunction with the various data repositories. The one or more storage management components may further provide functionality to translate data between the various data formats used by the multiple data repository types, such as by receiving and providing data via the abstraction interface in a common data format (e.g., a predefined serialized XML format) that is independent of the data formats used by the underlying data repositories. In at least some embodiments, the described techniques for transferring groups of data between heterogeneous data repositories are automatically performed by embodiments of a Storage Access Manager component and/or a Node Software component, as described in greater detail below.

In some embodiments, the described techniques may be used by a software system that tracks or otherwise obtains various types of data regarding users or other entities that are modeled by the system. A particular entity may then be represented within the software system with a group of data of various types that relate to the entity, such as with various data elements of various types that reflect different aspects of the entity (e.g., with the various data elements being stored so as to be independently modifiable or otherwise accessible). The software system in at least some embodiments includes multiple alternative data repositories for storing data regarding multiple entities, and stores some or all of the data for each entity in a single one of the multiple alternative data repositories. As previously noted, in order to facilitate interactions with multiple heterogeneous types of data repositories, including the transfer of entity-related data between heterogeneous data repository types, the software system in at least some embodiments uses an abstraction interface to provide a uniform interface for accessing the multiple data repository types. Additional details related to such storage and retrieval of data are included below.

FIG. 1 is a network diagram that illustrates an example of users interacting with a remote system that stores various data and provides various types of functionality, with embodiments of such a system able to use various of the described techniques for storing and transferring entity-related data. In particular, in this example embodiment, the system storing the data is a task exchange system 115 that stores data related to tasks and to users who supply and/or perform the tasks, and that provides functionality related to performance of tasks. For illustrative purposes, some embodiments are described herein in which specific types of users interact with specific types of systems in specific ways, and in which the systems store specific types of data and provide specific types of related functionality, including specific types of techniques for accessing stored data and transferring stored data between heterogeneous types of data repositories. These examples are provided for illustrative purposes and are simplified for the sake of brevity, and the inventive techniques can be used in a wide variety of other situations, some of which are discussed herein.

The task exchange system 115 may be implemented in various ways in various embodiments, such as in the form of a software system executing on one or more computing systems or devices (e.g., in a distributed manner, such as on a peer-to-peer or grid network). In addition, the types of tasks to be performed may have various forms in various embodiments. For example, there is a large class of tasks which computers and application programs cannot easily automatically perform, but which humans can typically easily perform, referred to herein as "human performance tasks." In at least some embodiments, the system 115 may enable the submission and performance of such human performance tasks. The ability of humans to perform such tasks is due at least in part to various cognitive and other mental capabilities of humans that are not easily encoded in automated programs, such as the ability to use human judgment to form opinions, to perform abstract or common-sense reasoning, to perform various discernment and perception tasks (e.g., visual and aural pattern recognition, such as based on experience), to use cultural awareness and emotional intelligence, and to perform various other everyday yet highly complex kinds of perception, cognition, reasoning and thinking.

In the example of FIG. 1, various task requesters 120 interact with the task exchange system 115 (e.g., by sending requests to the system 115 and receiving corresponding responses as appropriate) in order to supply tasks that are available to be performed by others, as well as to perform other related activities. For example, in addition to supplying tasks, a task requester may interact with the system 115 to obtain results from the performance by other users of previously supplied tasks, to obtain information about an account of the task requester (e.g., information about financial payments made to other users for performing tasks supplied by the task requester, information about previously specified preferences, etc.), to search for information about tasks and/or about users who are available to perform tasks, to specify types of qualifications that users may need to perform supplied tasks, etc. The task requesters 120 may take various forms, such as a task requester user who interactively accesses the system 115 (e.g., via a GUI, or graphical user interface, displayed on a computing system of the task requester user, not shown, such as a GUI based on Web pages provided by the system 115 and/or based on execution of a client-side application on the computing system), or a software application that is programmatically interacting with the system 115 (e.g., via an API of the system 115, not shown) on behalf of a related task requester user.

When a task requester supplies information about one or more tasks, the system 115 stores the task-related data as part of task information 145, which may then be made available to other users to perform the tasks in a manner specified by the task requester or otherwise determined by the system 115. The supplied information for a task may include a variety of types of information, including details related to the task (e.g., information to be analyzed, a question to be answered, etc.), one or more qualifications of any task performer user who performs the task, one or more geographical locations associated with the task, one or more capabilities and/or other current characteristics of one or more devices to be used as part of performing the task, one or more other criteria related to task performance (e.g., deadlines for completion, format of results from task performance, etc.), one or more associated rewards (e.g., monetary payments) to be provided to one or more task performer users who successfully perform the task, etc.

The system 115 stores various data across multiple alternative storage partitions in this example embodiment, such that at least some types of data are stored only on a single partition. In particular, in this example embodiment, the system 115 organizes data based on users with which the data is currently associated, so as to store a group of data related to a particular user together on a particular storage partition. Each storage partition may represent or include a particular database or other data repository, such that a variety of types of data repositories are used by the system 115 on various computing nodes. Thus, for example, when a particular task requester user supplies information about a new task, the system 115 determines an appropriate storage partition to store the information about the new task along with other information related to the task requester user. If the task requester is an existing user who already has information stored in a particular storage partition on a particular computing node, the system 115 may merely select that existing storage partition. Alternatively, If the task requester user is a new user or otherwise does not currently have an existing associated storage partition, the system 115 may determine an appropriate storage partition by considering one or more of a variety of types of information, such as about possible storage partitions, about the new user, and/or about other users that are related to the user.

In this example, the system 115 includes various alternative computing nodes 160 that store data related to task requester users, including example requester computing nodes 160a and 160n. As illustrated in detail with respect to requester node 160a, each requester node may include one or more storage partitions 165 that each store data related to one or more task requester users. Accordingly, in this example embodiment, the system 115 determines a particular storage partition on one of the requester nodes that corresponds to the particular task requester that supplied information about the new task, such as a first partition 165 on requester node 160a. Furthermore, in this illustrated embodiment, the computing node associated with a storage partition corresponding to a task requester user not only provides storage of data related to the task requester user, but also provides at least some of the system 115 functionality for the task requester user via an executing software program (not shown), such as to process and respond to various types of requests received from the task requester user. The computing nodes may have various forms in various embodiments, such as to each be a distinct physical computing system, to be one of one or more virtual machines hosted on a physical computing system, to include multiple physical computing systems working in concert, etc. In addition, in other embodiments storage partitions and/or data repositories may have other forms, such as to be split across multiple computing systems and/or to be provided by dedicated storage devices that do not themselves provide additional computing capabilities.

Thus, when a task requester user supplies information about a new task, the task-related information is in this example embodiment stored together on a single storage partition with at least some other information specific to the task requester user. In this example, the various task information 145 for the system 115 is stored in a distributed manner across the partitions 165 of the requester nodes 160, although in other embodiments such task information may be associated with other users in at least some situations (e.g., to temporarily associate information about a task with a task performer user while the task performer user is performing the task).

As previously noted, various types of information other than about supplied tasks may also be associated with task requester users and grouped together on storage, including information about previous interactions with the user and various administrative information (e.g., contact information, payment-related information, previously specified user preferences, other types of information associated with an account of the task requester user for the task exchange system 115, etc.). Such user information may be supplied by the user and/or generated by the system 115, and is stored as user information 130 by the system 115 in this example. As is illustrated, such user information may be stored by the requester nodes 160 when the user information corresponds to task requester users, but may additionally be stored on task performer computing nodes 170 when the user information corresponds to task performer users. In a manner similar to the requester nodes 160, the system 115 includes various alternative task performer nodes 170 in this example, including performer nodes 170a and 170m. As illustrated in detail with respect to performer node 170a, each performer node may include one or more storage partitions 175 that each includes a data repository storing data related to one or more task performer users.

Thus, when a task performer user 110 submits a request to or otherwise interacts with the system 115, the interaction is handled in a manner similar to that previously described with respect to the task requester users 120. The interaction may be, for example, to initiate performance of a specified task that is supplied by a task requester user, to obtain information about an account of the task performer (e.g., information about financial payments received from other users for performing tasks supplied by those other users, information about previously specified preferences, etc.), to search for information about tasks and/or about other users, to provide information about qualifications of the task performer user that may assist in performing various types of supplied tasks, etc. The task performer users 110 may similarly interact with the system 115 in various ways, such as via a GUI of the system 115 that is displayed on computing devices (not shown) of the task performer user.

As with requests from or other interactions by task requesters, after receiving a request from a particular task performer user, the system 115 determines an appropriate storage partition for the task performer user on one of the performer nodes 170, such as a first partition 175 on performer node 170a. For existing task performer users, a storage partition that already stores data for the task performer user may be quickly determined via retrieval of information from a lookup table or other mapping that maintains information about such associations. For new task performer users, an appropriate storage partition may be selected in a manner similar to that previously discussed for task requester users, such as based on information about the possible storage partitions, about the new user if such information is available, and/or about other users that are related to the user if such information is available. As one specific example, if information is available about types of tasks that the new task performer user has an affinity for performing, the system 115 may desire to store the new user's data on a storage partition that is proximate to one or more storage partitions that store data for task requester users who supply tasks of those types. Moreover, in embodiments in which at least some nodes may act as both requester nodes and performer nodes (or in which distinctions are not made between requester nodes and performer node, such that there is merely a group of computing nodes that may each store requester-related and/or performer-related data), the data for the new task performer user may be co-located on a particular storage partition with the data for one or more related task requester users who supply types of tasks for which the task performer user has an affinity.

After determining the appropriate storage partition for the task performer user, the system 115 transfers control of handling the task performer user's interaction to the computing node associated with the storage partition. For example, if the interaction is a request by the task performer user to perform a specified task supplied by a task requester user, the computing node associated with the task performer user's storage partition may interact with the computing node associated with that task requester user's storage partition to retrieve information about the task to be performed, such as under control of a software program (not shown) that is executing on the computing node associated with the task performer user's storage partition in order to provide some of the functionality of the system 115. In so doing, in some embodiments, the task information may be temporarily associated with the task performer user's storage partition while the task is being performed, while in other embodiments the task information may remain associated with the task requester user's storage partition but otherwise provide access to the information for the task performer user. After the task performer user performs the task (which may involve the task performer user supplying information and/or performing offline activities external to the system 115 and the task performer user's computing device), information about the results of the task performance are stored in the task performance user's storage partition, and may be made available to the task requester user in various ways (e.g., by automatically forwarding them to the task requester, supplying them to the task requester when the task requester user requests them, etc.). The aggregate task performance results information from the various task performer users then provides the task performance results information 150 for the system 115.

Figure 2:
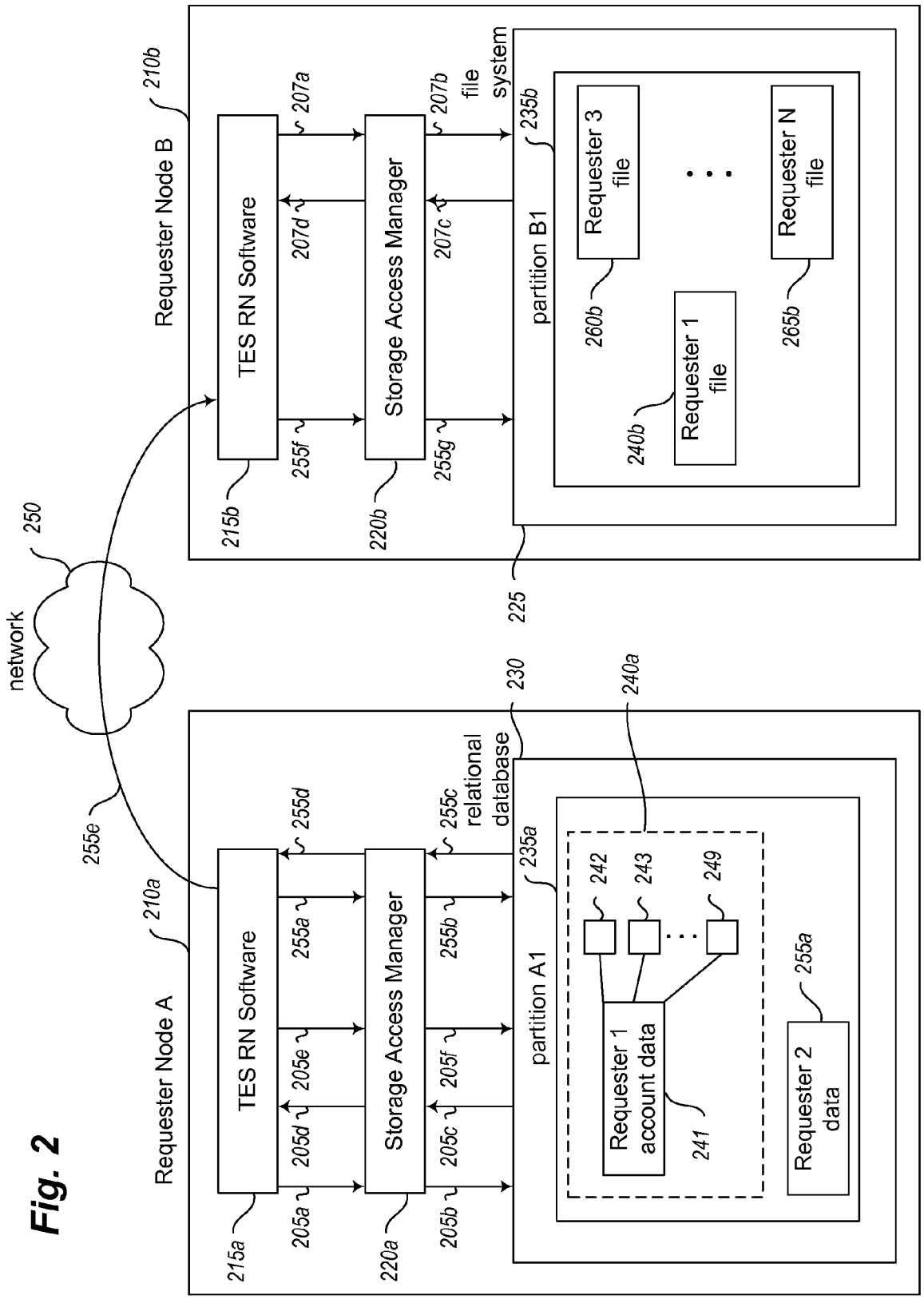
FIG. 2 illustrates an example of interactions to access data stored on heterogeneous types of data repositories and to transfer stored data between such data repositories.

Thus, the example system 115 stores various types of data and provides various types of functionality to users, which in this example embodiment are task performer users and task requester users acting as clients of the system 115. FIG. 2 illustrates portions of system 115 in additional detail, such as to illustrate how computing nodes within the system 115 may in at least some embodiments provide functionality to enable the transfer of entity-related data between heterogeneous data repository types on distinct computing nodes.

In particular, FIG. 2 illustrates examples of two of the requester nodes 160 of FIG. 1 (shown in FIG. 2 as Node A 210a and Node B 210b) in additional detail to show example interactions that occur between them via a network 250 (e.g., a network internal to the system 115). In this example embodiment, requester node 210a includes an executing software program 215a to provide functionality related to the operation of the requester node 210a (e.g., to handle interactions with requesters and with other computing nodes and computing systems within the system 115), and requester node 210b similarly includes an executing copy 215b of the software program to provide functionality related to the operation of the requester node 210b. While not illustrated here, performer nodes may each similarly include an executing software program to provide functionality related to the operation of the performer node (e.g., to handle interactions with performer users and with other computing nodes and computing systems within the system 115). Each of the computing nodes 210a and 210b may be implemented in various ways in various embodiments, as discussed elsewhere, and may include various components that are not illustrated here for the sake of simplicity (e.g., memory and a CPU or other processor to execute software, storage to support one or more data repositories and to store software and other data, various I/O devices, etc.).

As executing software program 215a provides functionality related to the operation of requester node 210a, the software program may access a data repository that is provided by or otherwise associated with the node 210a, such as to store data related to task requester users who are affiliated with the node 210a and/or to retrieve stored data related to such task requester users. In this example, the requester node 210a includes a storage partition A1 235a to store data related to task requester users affiliated with node 210a, and the requester node 210b similarly includes a storage partition B1 235b to store data related to task requester users affiliated with node 210b. In this example, however, the storage partitions are provided by different types of underlying data repositories, with the storage partition A1 235a being implemented as part of a relational database data repository 230 on node 210a, and with storage partition B1 235b being implemented as part of a file system data repository 225 on node 210b. It will be appreciated that a variety of other types of data repositories may be used to store data related to users and other entities in other embodiments, including, for example, key-value pair databases, caches and distributed caches, databases that are compliant with the Java Database Connectivity (JDBC) standard, object-oriented databases, Hibernate software and other object-relational mapping ("ORM") software, etc.

Furthermore, in the illustrated embodiment, the nodes 210a and 210b each include a copy of a Storage Access Manager software component 220 to facilitate interactions with the underlying data repositories on the computing nodes. In particular, the Storage Access Manager components 220 provide a common abstraction interface (not shown) via which the software programs 215 may access the underlying data repositories in a uniform manner, such as to shield the software programs from details specific to the types of the underlying data repositories. Thus, for example, the abstraction interface of a particular Storage Access Manager component 220 may allow a particular software program 215 to specify to store a particular data element, but without the storage request being specified in a manner specific to the underlying data repository (e.g., if the underlying data repository is an SQL-based relational database, without the storage request being specified in SQL). If so, the Storage Access Manager component then converts the storage request into a storage request that is specific to the underlying data repository (e.g., into an appropriate SQL statement if the underlying data repository is an SQL-based relational database), and interacts with the underlying data repository on behalf of the software program in the repository-specific manner to effect the storage.

Furthermore, in at least some embodiments, the abstraction provided by a Storage Access Manager component 220 for an underlying data repository includes using a common data format when exchanging data with a software program 215, such as a common data format that is independent of some or all of the data formats used by underlying data repositories. If so, the Storage Access Manager component converts data between the common data format and the data format specific to the underlying data repository as appropriate so that interactions with the underlying data repository occur in a data format specific to that data repository. Thus, based on the abstraction interface provided by a Storage Access Manager component 220, a software program 215 interacting with a Storage Access Manager component may in at least some embodiments be unaware of the type of underlying data repository, so as to enable the software program 215 to interact in a uniform manner with any of the heterogeneous types of data repositories supported by the Storage Access Manager component.

In the example illustrated in FIG. 2, the software program 215a performs various interactions with the Storage Access Manager component 210a so as to access and modify data related to a particular task requester user Requester 1 (not shown) whose data is currently affiliated with the relational database data repository 230. The software program 215a first determines to retrieve a subset of the stored data for Requester 1, such as in response to a request from a task requester user. For example, the stored data for Requester 1 may reflect various prior interactions of Requester 1 with the task exchange system, and Requester 1 may initiate a request for stored information about task performer qualifications that the task requester has associated with one or more supplied tasks that have not yet been performed (e.g., required qualifications for task performer users who desire to perform those supplied tasks). Accordingly, the software program 215a initiates a data retrieval request 205a to the Storage Access Manager component 220a, using the abstraction interface to specify the request in a manner independent of the underlying relational database data repository 230. The Storage Access Manager component 220a then converts the data retrieval request into a format that corresponds to the relational database data repository 230 and its internal structure (e.g., an SQL Select operation that indicates one or more particular internal database tables that store information associated with submitted tasks), and initiates an interaction 205b with the relational database data repository 230 using the converted data retrieval request to retrieve the requested data. After the requested data is retrieved from the relational database data repository 230, it is returned 205c to the Storage Access Manager component 220a in a data format specific to the relational database data repository 230 (e.g., as a list of task qualifications that is extracted from an internal table with task-related information, such as with each entry in the list indicating a particular task and a corresponding specified qualification). The Storage Access Manager component 220a then converts the returned data into the common data format, and returns 205d the converted data to the software program 215a (e.g., as a response to the initial request 205a).

In this example, the relational database data repository 230 stores all of the data related to multiple task requester users, including a group of data 240a corresponding to task requester user Requester 1 and a group of data 255a corresponding to task requester user Requester 2. As is shown in greater detail with respect to data group 240a for Requester 1, each data group may include a number of distinct data elements of various types. In this example, the data group 240a includes one or more data elements 241 that store account data for Requester 1 (e.g., a current balance of money owed to task performer users for performing previously supplied tasks, contact information for the task requester user, financial account information for use in paying task performer users, etc.), and various other data elements 242-249. For example, one or more data elements 242 may correspond to tasks supplied by Requester 1 that have not yet been performed, and may be stored internally in the data repository as rows in one or more task-related tables. If so, the request 205a and resulting interaction 205b may result in retrieving some of the data stored for the data elements 242. As will be appreciated, the various data elements 241-249 may be associated within the data repository in various ways, such as by being linked via one or more keys (e.g., a unique requester ID for each task requester, a unique ID for a type of task defined by the task requester, etc.). Furthermore, while data groups 240a and 255a are illustrated as distinct groups of data, it will be appreciated that the data may be stored internally in the data repository in various ways (e.g., by data groups 240a and 255a including data elements that are stored in the same internal tables).

In this example, after the task qualification-related data for Requester 1 is retrieved, the software program 215a determines to update at least a portion of that data (e.g., in response to instructions from Requester 1), such as to modify or add a qualification associated with a particular task. Accordingly, the software program 215a initiates a data storage request 205e to the Storage Access Manager component 220a, using the abstraction interface to specify the request in a manner independent of the underlying relational database data repository 230. As will be appreciated, the abstraction interface may provide capabilities to provide various operations that are a subset of or a superset of some or all types of data repositories, including by having a portion of the abstraction interface that is related to data retrieval operations and a portion of the abstraction interface that is related to data storage operations. In this example, the data storage request 205e includes the data to be stored, which is specified in the common data format, and the Storage Access Manager component 220a converts the data storage request into a format that corresponds to the relational database data repository 230 and its internal structure, including to convert the accompanying data to be stored into a data format corresponding to the relational database data repository 230 and its internal structure (e.g., as an SQL Insert or Update operation that specifies the one or more internal tables and fields, or columns, in which particular data values are to be stored). The Storage Access Manager component 220a then initiates an interaction 205f with the relational database data repository 230 using the converted data storage request to update the stored data. While not illustrated here, a response to the data storage request may be returned to the software program 215a in some situations. Thus, in this manner, the abstraction interface allows the software program 215a to interact with the underlying data repository 230 in a manner independent of the data repository.

In a similar manner, the software program 215b on computing node 210b may interact with the underlying file system data repository 225 in a manner independent of that data repository via use of the abstraction interface provided by the Storage Access Manager component 220b. Thus, software program 215b may initiate one or more data storage requests and/or data retrieval requests related to the storage of data for task requester users whose data is stored in the underlying file system data repository 225, which in this example includes task requester users Requester 3 through Requester N. Each task requester user has a group of data stored in one or more files 260b and 265b in the file system data repository 225. In a manner similar to that described with respect to computing node 210a, each request 207a that is initiated by the software program 215b is provided to the Storage Access Manager component 220b via the abstraction interface. The Storage Access Manager component 220b then converts the request into a format that corresponds to the file system data repository 225 and its internal structure (e.g., to correspond to one or more file read or write operations), including to convert any accompanying data that is to be stored into a data format corresponding to the file system data repository 225 and its internal structure (e.g., comma-delimited plain text). The Storage Access Manager component 220b then initiates an interaction 207b with the file system data repository 225 using the converted request so as to retrieve or store data in accordance with the request. A response 207c is then received by the Storage Access Manager component 220b in a format specific to the file system data repository 225 (e.g., for data being retrieved, as a particular file or as text from a file), which converts any received data into the common data format, and forwards 207d a response and any converted data to the software program 215b in accordance with the abstraction interface.

Thus, by using the abstraction interface and related functionality of the Storage Access Manager components 220 to store and retrieve data from local data repositories, the software programs 215 may operate in a distributed manner and manage the state of particular entities in a manner independent of the underlying data repositories that store the entity-related data.

In addition to using the abstraction interface and related functionality of the Storage Access Manager components 220 to store and retrieve data from local data repositories, the software programs 215 may also use the functionality to transfer data for a user (or other entity) between data repositories, such as between heterogeneous types of data repositories on distinct computing nodes. For example, a determination may be made to transfer some or all of the data that is currently stored in a particular data repository for a particular user to a different data repository. In the illustrated embodiment of FIG. 2, after the interactions 205a-205f have occurred, the software program 215a initiates a transfer of the group of data 240a for Requester 1 from the relational database data repository 230 provided by computing node 210a to the file system data repository 225 provided by computing node 210b. The determination to perform such a data transfer may be made in various ways in various embodiments, as discussed in greater detail elsewhere.

In this example, the software program 215a first identifies or determines how to identify the various data elements 241-249 that are part of the group of data 240a, such as by identifying the various aspects for which data has previously been stored, by identifying a mechanism via which all data for the user may be requested (e.g., to request all data that is associated with a particular requester ID for the user, to request a single file that contains all data for a particular user, etc.), and/or by retrieving a stored mapping that is maintained of all such data aspects for Requester 1. For example, in some embodiments, some or all task requester users may each have data elements that correspond to a non-exclusive list of aspects or other attributes of the task requester user as follows: available tasks that the user has supplied but that have not yet been performed; completed tasks that the user has supplied and that have been performed or are otherwise completed; any types or sets of tasks that the user has defined; statistics related to prior interactions of the user with the task exchange system, such as prior percentages of task performance results provided by performer users that have been approved and/or rejected by the user, an average time between the completion of a task by a performer and the user's review of the performer's results in order to approve or reject them, etc.; types of qualifications that the user has defined; qualifications that the user has assigned to task performer users; and information about financial aspects of the user's account, such as a current credit or debit associated with the account, an indication of one or more financial accounts or other mechanisms via which the user will provide payment to performer users or the task exchange system, etc. In addition, in some embodiments, some or all task performer users may each have data elements that correspond to a non-exclusive list of aspects or other attributes of the task performer user as follows: available tasks supplied by task requester users that are currently assigned to the user for performance; a current list of tasks that are available for performance by the user (e.g., a list of task search results through which the user can iterate); a list or other identification of tasks previously completed by the user (e.g., to ensure that the user does not perform the same task twice); details related to a history of previous tasks that were assigned to the user, such as for a limited prior period (e.g., 30 days); information about financial aspects of the user's account, such as a current credit or debit associated with the account, an indication of one or more financial accounts or other mechanisms via which the user will receive payment from requester users or the task exchange system, etc.; qualifications that the user possesses; and statistics related to prior interactions of the user with the task exchange system, such as a cumulative total and/or percentage of tasks that the user has previously performed, returned without performance, or abandoned without explicit return, prior percentages of task performance results provided by the user that have been approved and/or rejected by task requester users, etc. In other embodiments, the identification of the various data elements that relate to a particular user may be made in other ways, including by the Storage Access Manager component 220 and/or underlying data repository 230.

In some embodiments, an entity and its associated data elements may refer to a collection of information within a single scope of serializability, such as a storage partition. For example, information that is associated with an identified user and is part of an indivisible "entity" corresponding to that user may be assigned to a particular storage partition, with all actions associated with that entity being handled by the assigned storage partition. Alternatively, in other embodiments, information related to a particular user may correspond to a collection of several entities, a collection of multiple users may be part of a single entity, and/or an entity may include information that is unrelated to any user. Each storage partition may in some embodiments exclusively store information about a set of one or more entities, such that there is no overlap of stored information for those entities between storage partitions. In addition, in at least some embodiments, it may be beneficial to create and maintain each entity such that the size of the stored information for a single entity is small compared to the storage size of the storage partition that stores it.

In some embodiments, entities may have some or all of the following properties: it is possible to create or destroy an entity's data without modifying existing entities of the same type; it is possible to create or destroy an entity's data without requiring locks over related stored information used by existing entities (e.g., over tables in a relational database data repository that store data elements for multiple entities); and an entity's data graph has a traversable query relationship up to the entity's "root" (e.g., a root table in a relational database data repository that stores the information), as discussed below. In addition, one example, non-exclusive, procedure for modeling entities is as follows, in the context of using a relational database as the underlying data repository for a storage partition that will store the entities' information: construct a data model with a table layout that balances logical grouping with table size and lock scope; given an external user or other actor or set of related actors, identify operations that (a) have absolute requirements for data integrity and consistency, or (b) are critical to the identity of the actor; for each operation, identify the tables that participate in locked/transacted database calls; list all tables that were locked by any of the operations to determine an "entity data graph" for an entity corresponding to the actor; determine the "root" table for the entity based on the table for which there is one-and-only-one row for the set of common operations as done by an actor (e.g., to correspond to the actor who initiates the operations, or in the case of a hierarchy of actors likely to the highest-level actor); if so desired, revisit prior steps and revise data model as appropriate so that the entity data graph does not include data elements unnecessary for that entity, but that might be otherwise be of use (e.g., any such unnecessary data elements, or a significant number of such unnecessary data elements); use the root table identifier as an identifier for the entity, such as for storage partition assignment and storage partition migration; and, if so desired, use nested or child entities to provide storage partition addressing at a sub-entity level (e.g., to allow tasks supplied by a requester user to be part of a requester user entity, but to be addressed independently) but with entity migration between storage partitions performed only on entities with no parent (e.g., the requester user entity rather than the task sub-entity).

After identifying or determining how to identify the various data elements that are part of the group of data for Requester 1, the software program 215a sends one or more requests 255a to the Storage Access Manager component 220a to retrieve the data elements of Requester 1's group of data, using the abstraction interface in a manner similar to that previously discussed. The Storage Access Manager component 220a then converts each data retrieval request into a format that corresponds to the relational database data repository 230, and initiates an interaction 255b with the relational database data repository 230 using the converted data retrieval request to retrieve the stored data of interest. The retrieved data is then returned 255c to the Storage Access Manager component 220a in the data format specific to the relational database data repository 230. The Storage Access Manager component 220a then converts the returned data into the common data format, and returns 255d the converted data to the software program 215a. The software program 215a then forwards 255e the retrieved data in the common data format over the network 250 to the software program 215b on computing node 210b. After receiving the forwarded data, the software program 215b interacts with the Storage Access Manager 220b to store the forwarded data on the file system data repository 225 in a manner associated with Requester 1, such as to create a new file 240b to hold the group of data for Requester 1. In particular, the software program 215b initiates one or more data storage requests 255f to the Storage Access Manager component 220b, using the abstraction interface to specify the request(s) in a manner independent of the underlying file system data repository 225 and providing the forwarded data in the common data format. The Storage Access Manager component 220*b* then converts each data storage request into a format that corresponds to the file system data repository 225 and its internal structure, and initiates an interaction 255*g* with the file system data repository 225 using the converted data storage request to store the provided data. While not illustrated here, a response to the data storage request(s) may be returned to the software program 215*b* in some situations.

In this manner, the software programs 215*a* and 215*b* and Storage Access Manager components 220*a* and 220*b* interact to transfer the group of data 240*a* from relational database data repository 230 to be a group of data 240*b* in file system data repository 225. In some embodiments, the group of data 240*a* may be left in relational database data repository 230, such as to replicate the group of data in two or more data repositories (e.g., to mirror a portion of a data repository), while in other embodiments the group of data 240*a* is removed from the relational database data repository 230 so that it is persistently stored only in a single data repository. In addition, the described actions for transferring a group of data may be performed in other manners in other embodiments, such as by having only a single software program (e.g., software program 215*a* or software program 215*b*) interact with both Storage Access Manager components 220*a* and 220*b*. While not illustrated here, the system 115 may in some embodiments maintain a mapping of each user (or other entity) to the data repository or storage partition that currently stores data for that user. If so, the transfer of the group of data from data repository 230 to data repository 225 may further include updating the mapping so that Requester 1 is associated with data repository 225.

Other requester nodes 210*x* may include components similar to those of nodes 210*a* and 210*b*, and may perform similar interactions to those of nodes 210*a* and 210*b*, but are not illustrated in the example of FIG. 2. In addition, in at least some embodiments, various performer nodes may be present and include components similar to those of nodes 210*a* and 210*b*, and the performer nodes may perform various interactions between themselves and/or with requester nodes. In this manner, various computing nodes of the system 115 may interact in various ways to access, store and transfer data related to users and other entities.

In addition, an abstraction interface and corresponding software component may be implemented in various ways in various embodiments. For example, rather than having a Storage Access Manager component 220 on each computing node, one or more centralized Storage Access Manager components may provide access to multiple data repositories of multiple types, such as multiple data repositories provided by multiple remote computing nodes. In addition, one non-exclusive specific example that provides at least some functionality corresponding to such an abstraction interface and corresponding software component is the open-source Carbonado software, an extensible, high performance persistence abstraction layer for Java applications.

As previously noted, a determination may be made to transfer data for an entity from a current data repository to a different data repository at various times and for various reasons. For example, in some embodiments the transfer of entity-related data may be initiated by the task exchange system to enhance overall system performance, such as if a current data repository is over-utilized and/or the new data repository is under-utilized, or such as if the new data repository is more proximate to other data that the entity may access. For example, the system may monitor performance of the system, including the current data repositories and associated computing nodes, and may initiate user data migrations or other entity-related data transfers. The performance monitoring may include monitoring measurements of the computing nodes' performance (e.g., levels of usage of memory, storage, network bandwidth, I/O access, etc.), such as to identify computing nodes that are over-utilized or under-utilized in one or more areas. If areas of over-utilization and/or under-utilization are detected, they may be corrected in various ways. As one example, users with similar usage patterns may be grouped together, such as to group users with CPU-intensive or memory-intensive usage patterns on computing nodes that have enhanced capabilities in those areas. As another example, users with complementary usage patterns may be grouped together, such as to group a first user with a CPU-intensive usage pattern with a second user with an I/O access-intensive usage pattern, so that different users are consuming different resources of a single computing node. Moreover, users may be grouped in a variety of other ways, such as to match users with differing usage patterns based on time-of-day, day-of-week, etc. In addition to grouping users based merely on usage patterns and on resource capabilities of computing nodes, various other factors may be considered in at least some embodiments when determining whether to migrate a user's data from a current data repository to a new data repository.

Furthermore, in some embodiments an entity's data may be transferred to a new data repository for other purposes, such as to archive data for user whose accounts have been closed, or for user data that is infrequently accessed or that has not been accessed for a predetermined period of time. In other embodiments, data for an entity may be temporarily copied or transferred to a different data repository, such as to a remote system for offline testing. In addition, in some embodiments a migration or other transfer of a user's data may be initiated by the user (e.g., to request an enhanced level of services or capabilities, such as for a fee), such as if an embodiment provides differentiated capabilities (e.g., different levels of quality-of-service or different types of capabilities on different computing nodes). Furthermore, by using the described techniques, an incremental change may be made to a version or type of underlying data repository that is being used. For example, if a single type and version of a data repository is initially used by an embodiment of a task exchange system, and a new version or type of data repository is later introduced, the data for some or all of the various entities in the system may be gradually transferred to the new version or type of data repository in such a manner that, while an entity's data is being transferred, access to other system data remains available. It will be appreciated that the transfer of entity-related data may be performed for other reasons and by other types of systems in other embodiments, and that in some embodiments the described techniques may be used for groups of data that are not related to entities.

In the example embodiments described with respect to FIGS. 1 and 2, the techniques for storing data in and retrieving data from heterogeneous types of data repositories are provided and used by a task exchange system. By enabling large numbers of unaffiliated or otherwise unrelated task requesters and task performers to interact via the intermediary task exchange system in this manner, free-market mechanisms may be used to efficiently perform tasks with location-based and/or device-based criteria regarding task performance. Additional details related to examples of interactions of users with particular embodiments of task exchange systems are included in pending commonly-owned U.S. patent application Ser. No. 10/990,949, filed Nov. 16, 2004 and entitled "Providing an Electronic Marketplace to Facilitate Human Performance of Programmatically Submitted Tasks," and in pending commonly-owned U.S. patent application Ser. No. 11/396,286, filed Mar. 31, 2006 and entitled "Facilitating Content Generation Via Messaging System Interactions," each of which is hereby incorporated by reference. Nonetheless, it will be appreciated that the described techniques may further be used with a wide variety of other types of systems and in other types of situations.

Figure 3:
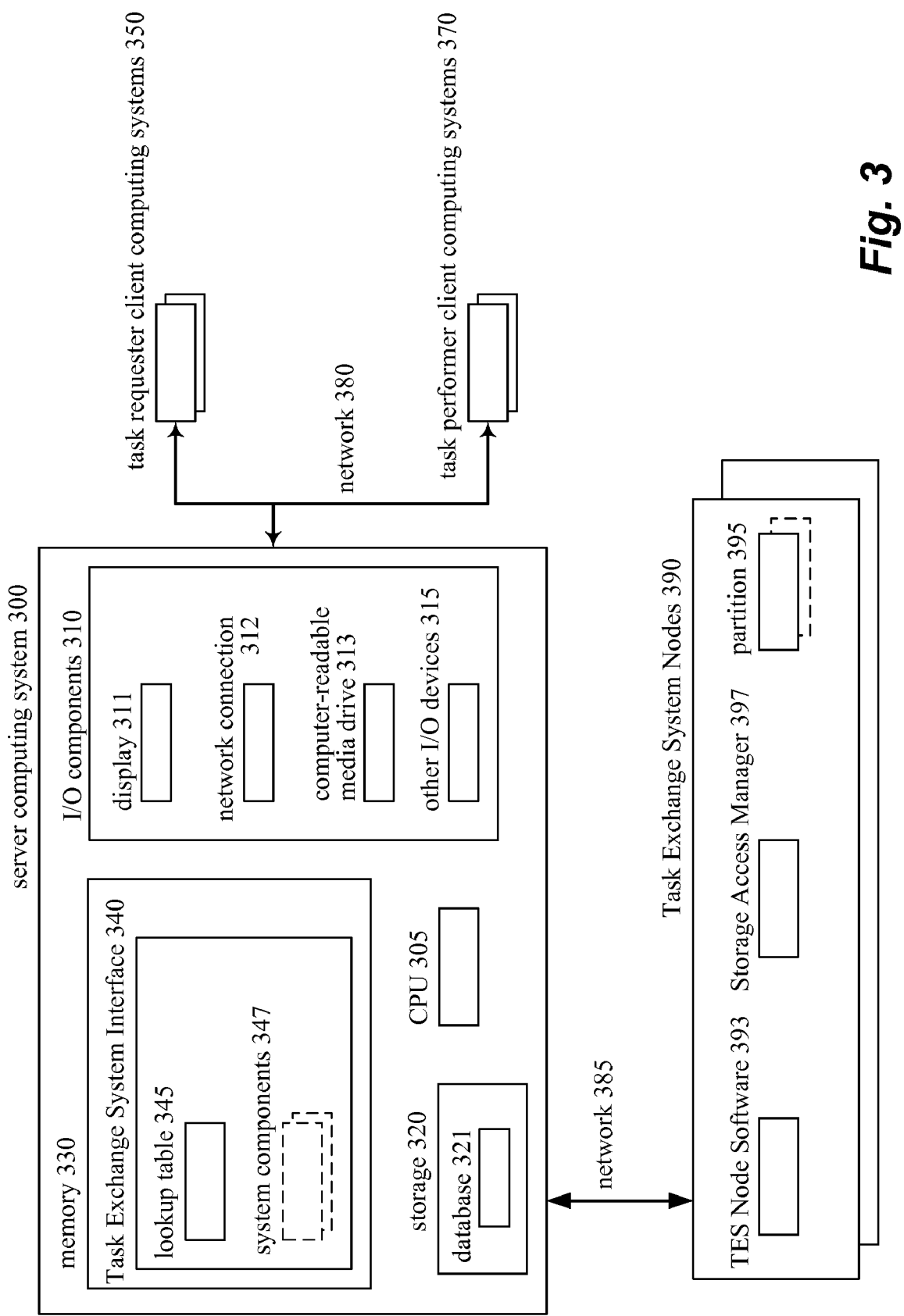
FIG. 3 is a block diagram illustrating an example computing system suitable for executing an embodiment of a software system for transferring stored data between heterogeneous types of data repositories.

FIG. 3 is a block diagram illustrating example computing systems suitable for performing techniques for storing data in and retrieving data from heterogeneous types of data repositories in various situations. In particular, FIG. 3 illustrates a server computing system 300 suitable for executing an embodiment of an interface to a task exchange system, as well as various task requester client computing systems 350, task performer client computing systems 370, and other computing nodes 390 that support the task exchange system. In the illustrated embodiment, the server computing system 300 has components that include a CPU 305, various I/O components 310, storage 320, and memory 330. The I/O components include a display 311, a network connection 312, a computer-readable media drive 313, and other I/O devices 315 (e.g., a mouse, keyboard, etc.). The other computing systems 350 and 370 and the computing nodes 390 each may include similar components to those of the server computing system, but are not illustrated in detail here.

An embodiment of an interface portion of a task exchange system 340 is executing in memory, and it interacts with the client computing systems 350 and 370 over a network 380 using the network connection 312 (e.g., via the Internet and/or the World Wide Web, cellular network, etc.). In particular, users of task requester client computing systems 350 may interact with the system interface 340 in order to provide information about available tasks to be performed, as well as to perform other related interactions. Similarly, task performer users may use task performer computing systems 370 to interact with the system interface 340 to obtain information about available tasks and provide task performance results information, as well as to perform other related interactions.

As previously described, for at least some interactions initiated by the client computing systems 350 and 370, the system interface 340 responds by identifying an appropriate storage partition and/or data repository for a user associated with the interaction, and then directs a computing node associated with that storage partition or data repository to handle the interaction. In particular, in this example, the server computing system 300 is connected to multiple task exchange system alternative computing nodes 390 via another network 385 (e.g., a network internal to the task exchange system, such as if the computing nodes 390 are not directly accessible to external computing systems such as computing systems 350 and 370). Each of the alternative computing nodes 390 includes at least one storage partition 395 to store data for one or more types of users, and optionally one or more additional such storage partitions, with each storage partition supported by an underlying data repository (not shown). When the initiated interaction is related to an existing user, the system interface 340 uses a lookup table 345 or other mapping to identify a particular storage partition and/or data repository for the user, and directs the user's request to the computing node that provides that storage partition or data repository. For new users or other users for which an existing storage partition is not available, the system interface 340 may determine an appropriate storage partition or data repository in various ways (e.g., based on excess capacity; based on a measure of locality of the user's computing device to the computing node that provides that storage partition or data repository; in a manner to distribute new users among the various data repositories and storage partitions, such as by random, via round robin, or via consistent hashing; etc.), and directs the user's request to the computing node that provides that storage partition. While not illustrated in detail here, in some embodiments the computing nodes 390 may instead be of varying types (e.g., separated into requester nodes and performer nodes, such as to support different types of functionality corresponding to those types of users; separated by offering different types or levels of capabilities, such as if some computing nodes support higher levels of quality of service and/or include additional capabilities for use by premium customers; separated by the type of data repository that the computing node provides; etc.).

When one of the computing nodes 390 is directed to handle an interaction with a user, or in response to other types of events, one or more software programs 393 executing on that computing node may perform various actions in response. For example, as discussed in greater detail elsewhere, a software program 393 may store data related to the user in and/or retrieve data related to the user from a storage partition 395 on the computing node, such as by interacting with a Storage Access Manager component 397 on the computing node via an abstraction interface (not shown) that is provided by the component 397. The component 397 may then initiate the actual storage and/or retrieval of the data in the storage partition 395, such as by interacting with an underlying data repository that provides the storage partition in a manner specific to the type of that data repository and to details of that underlying data repository. Furthermore, the software program 393 and Storage Access Manager component 397 on a computing node 390 may facilitate the transfer of data related to a user or other entity from that computing node to a storage partition and/or data repository on another computing node, as described in greater detail elsewhere.

In addition, in at least some embodiments and for some types of interactions, the system interface 340 may directly handle the interactions without directing the interactions to particular computing nodes 390. For example, the task exchange system may maintain some types of data in a general data repository that is not distributed among the computing nodes 390, such as in a database 321 on storage 320. If so, the system interface 340 may respond to requests to access or change such data directly without using the computing nodes 390. In other embodiments, such general data may not be maintained and used. Furthermore, in some embodiments, the system interface 340 and/or other portions of the task exchange system may optionally be separated into multiple components that each provides one or more distinct types of functionality, although particular such components are not illustrated in this example embodiment.

Those skilled in the art will appreciate that computing systems and nodes 300, 350, 370 and 390 are merely illustrative and are not intended to limit the scope of the embodiments of the present disclosure. The task exchange system may instead be executed by multiple interacting computing systems or devices, and computing system 300 may be connected to other devices that are not illustrated, including through one or more networks such as the Internet, via the World Wide Web ("Web"), or other electronic communications network (e.g., cellular based network, public switched telephone network). More generally, a "client" or "server" computing system or computing device or a computing node may comprise any combination of hardware or software that can interact, including (without limitation) desktop or other computers, network devices, PDAs, cellphones, wireless phones, pagers, electronic organizers, Internet appliances, television-based systems (e.g., using set-top boxes and/or personal/digital video recorders), game consoles, media players and various other consumer products that include appropriate inter-communication capabilities. In addition, the functionality provided by the task exchange system, including by the node software components and storage access manager components, may in some embodiments be combined in fewer components or distributed in additional components than is described herein. Similarly, in some embodiments, the functionality of some of the components may not be provided as part of the task exchange system, and/or other additional functionality may be available.

Those skilled in the art will also appreciate that, while various items are discussed or illustrated as being stored in memory or on storage while being used, these items or portions of them can be transferred between memory and other storage devices for purposes of memory management and data integrity. Alternatively, in other embodiments some or all of the software components may execute in memory on another device and communicate with the illustrated computing system via inter-computer communication. Some or all of the system components and/or data structures may also be stored (e.g., as software instructions or structured data) on a computer-readable medium, such as a hard disk, a memory, a network, or a portable media article to be read by an appropriate drive or via an appropriate connection. The system components and data structures may also be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

Figure 4:
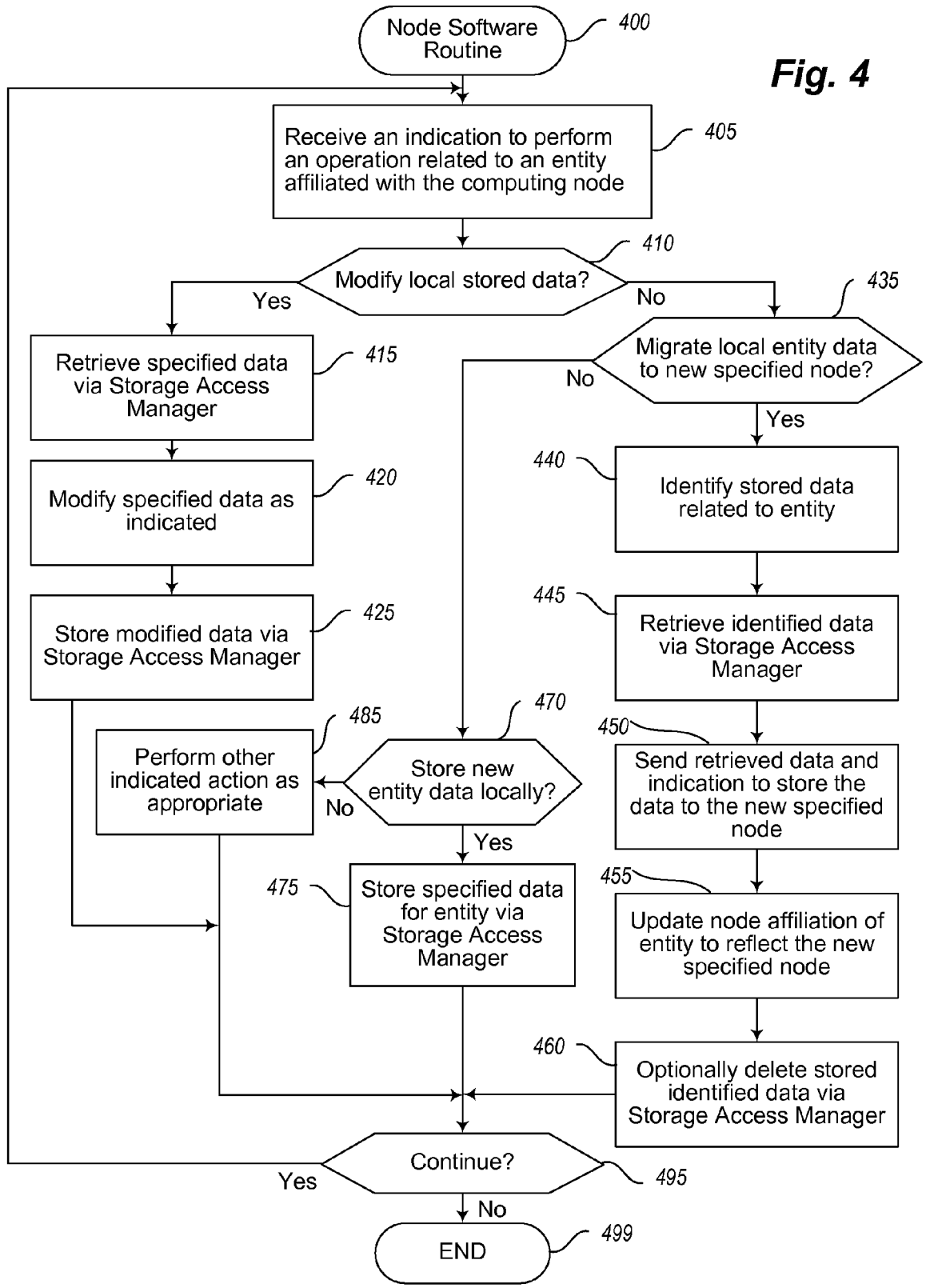
FIG. 4 illustrates a flow diagram of an example embodiment of a Node Software routine.

FIG. 4 is a flow diagram of an example embodiment of a Node Software routine 400. The routine may be provided by, for example, execution of software program 215 of FIG. 2 and/or of software program 393 of FIG. 3, such as to execute in accordance with one or more computing nodes in order to store data in and retrieve data from one or more of multiple heterogeneous types of data repositories provided by the one or more computing nodes in various situations. In the illustrated embodiment, each computing node may execute a separate instance of the routine to support system-related operations for that computing node, including to interact with a data repository provided by that computing node. In addition, the routine may interact with other instances of the routine on other computing nodes in some situations (e.g., to transfer a group of data related to an entity to another computing node) in the illustrated embodiment, while in other embodiments a single instance of the routine may support multiple computing nodes and may perform all of the corresponding actions to effect such a data group transfer between such computing nodes.

The illustrated embodiment of the routine 400 begins at block 405, where an indication is received to perform an operation related to an entity affiliated with the computing node associated with the routine, such as based on an interaction with the entity, with another instance of the routine affiliated with another computing node, or with another component of the task exchange system. The routine continues to block 410 to determine whether the operation indicated in block 405 involves modifying data that is stored in a data repository associated with the local computing node. If so, the routine continues to block 415 to optionally retrieve the currently stored data that is to be modified by interacting with a copy of a storage access manager component that provides an abstraction interface for the associated data repository, such as if the data modification is to be performed based on the currently stored data (e.g., in a manner relative to the currently stored data). In block 420, the routine then modifies the retrieved data in an indicated manner, and in block 425 stores the modified data in the associated data repository by interacting with the abstraction interface of the storage access manager component for the associated data repository. Alternatively, if the operation to modify the stored data includes data that is provided to replace existing stored data, blocks 415 and 420 may be skipped, and in block 425 the routine may store the provided data.

If it is instead determined in block 410 that the operation is not to modify stored data, the routine continues to block 435 to determine whether the operation indicated in block 405 is to migrate or otherwise transfer data related to an indicated entity from the associated data repository to another data repository, such as another data repository of a distinct type on another computing node. If not, the routine continues to block 470 to determine whether the operation indicated in block 405 is to store new data for an entity in the associated data repository, such as new data provided by the entity, or an indication from another instance of the routine that is transferring entity-related data to the data repository provided by the computing node. If so, the routine continues to block 475 to store the specified data for the entity in the associated data repository by interacting with the storage access manager component for the associated data repository. If not, the routine continues to block 485 to perform another indicated operation as appropriate (e.g., to retrieve and provide data stored in the associated data repository; to request data of interest from another computing node, such as for a task performer user to request information about one or more tasks that are available to be performed for one or more other computing nodes whose data repositories store data for the one or more task requester users who supplied those tasks; etc.).

If it is instead determined in block 435 that the operation is to migrate or otherwise transfer data related to an indicated entity from the associated data repository to another data repository, the routine continues instead to block 440 to identify the stored data related to the entity. In other embodiments, the stored data for the entity may be identified in other manners (e.g., provided in block 405, identifiable by the storage access manager component for the associated data repository, etc.), and if so block 440 may not be performed. In block 445, the routine then retrieves the identified data from the associated data repository via the abstract interface of the storage access manager component, and in block 450 sends the retrieved data to a computing node associated with the other data repository for storage on that other data repository, so that an instance of the routine 400 for that other computing node may store the sent data on that other data repository. In block 455, the routine then updates the node affiliation for the user so that the user is associated with the computing node that provides the other data repository, although in other embodiments the updating of such node affiliation may instead be performed by the routine on the other computing node that actually stores the sent data on that other data repository. In block 460, the routine then optionally deletes the identified data from the associated data repository, such as if it is desired to maintain a single copy of the data for the entity. While not illustrated here, it will be appreciated that in at least some embodiments, access by other routines to the data related to the entity may be temporarily blocked while the routine performs blocks 440-455, so as to prevent race conditions and other situations of concurrent access to the same data.

After blocks 425, 460, 475 or 485, the routine continues to block 495 to determine whether to continue. If so, the routine returns to block 405, and if not continues to block 499 and ends.

FIG. 5 is a flow diagram of an example embodiment of a Storage Access Manager routine 500. The routine may be provided by, for example, execution of Storage Access Manager component 220 of FIG. 2 and/or of Storage Access Manager component 397 of FIG. 3. The routine executes in accordance with one or more computing nodes in order to interact with one or more of multiple heterogeneous types of data repositories provided by the one or more computing nodes in a manner specific to those data repositories, while providing an abstraction interface to allow other software to access those data repositories in a uniform manner independent of the type of those data repositories. In the illustrated embodiment, each computing node may execute a separate instance of the routine to support the data repository provided by that computing node, while in other embodiments a single instance of the routine may support the data repositories provided by multiple computing nodes.

The illustrated embodiment of the routine 500 begins at block 505, where an indication is received to perform a storage-related operation for indicated data that is related to an entity affiliated with the computing node with which the routine is associated, with the storage-related operation being specified in accordance with a defined uniform abstraction interface. The routine continues to block 510 to determine the type of underlying data repository provided by the computing node, and in block 515 interacts with the underlying data repository in a manner specific to that data repository in order to perform the indicated storage-related operation. In other embodiments, a particular instance of the routine may be initially configured to support a particular data repository of a particular type, and if so block 510 may not be performed, or instead block 510 may be performed only a single time during execution of the routine if only a single underlying data repository is supported. The interaction in block 515 may include, for example, modifying or replacing the storage-related operation indicated in block 505 with one or more distinct storage-related operations that are specific to the underlying data repository. Furthermore, if the indicated storage-related operation is to store provided data, and the data is provided in a common data format that is not specific to the underlying data repository, the routine may further convert the provided data into a data format that is specific to the underlying data repository to facility the repository-specific operations that are performed.

After block 515, the routine continues to block 520 to determine whether data is being returned from performance of the operation in block 515, such as for a data retrieval operation. If so, the routine continues to block 525 to modify the data being returned as appropriate so that the data is in a predefined common data format, and in block 530 returns the modified data to the requester who provided the indication in block 505. If it is instead determined in block 520 that data is not being returned from performance of the operation in block 515, the routine continues instead to block 540 to optionally send a status response to the requester who provided the indication in block 505. After blocks 530 or 540, the routine continues to block 595 to determine whether to continue. If so, the routine returns to block 505, and if not continues to block 599 and ends.

It will be appreciated that the task exchange system may have other components that provide a variety of other types of functionality as part of their operation, but that are not described in detail here.

Those skilled in the art will also appreciate that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method for facilitating storage of data related to tasks on multiple distinct types of data repositories, the tasks being available via a computer-implemented task exchange system that acts as an intermediary to facilitate performance by human task performer users of tasks from task requester users, the method comprising:

for each of multiple users of the task exchange system, storing a group of data for the user that reflects prior interactions of the user with the task exchange system related to supplying tasks to be performed by others and/or to performing tasks supplied by others, the group of data for each user including multiple data elements of multiple types and being persistently stored in one of multiple data repositories that are each provided by one of multiple computing systems of the task exchange system, the multiple data repositories being of multiple types;

receiving a request to migrate all stored data for one of the users from a first data repository provided by a first computing system that currently stores data for the one user to a distinct second data repository provided by a distinct second computing system, the first data repository being of a first type and the second data repository being of a distinct second type;

automatically determining the multiple data elements that are part of the stored group of data for the one user; and automatically migrating the stored data for the one user using an abstraction interface that provides a uniform interface for interacting with multiple data repositories of multiple distinct types and that includes at least a data retrieval interface portion and a data storage interface portion, the migrating including, under control of a storage manager component executing on the first computing system to provide the abstraction interface for the first data repository, receiving a request to retrieve the multiple data elements of the stored group of data for the one user from the first data repository, the request received via the data retrieval interface portion of the abstraction interface such that the received request is specified in a manner independent of the first type of the first data repository;

retrieving from the first data repository the multiple data elements of the stored group of data for the one user, the retrieving being performed in a manner specific to the first data repository, and the retrieved data elements being in a data format specific to the first data repository;

modifying the retrieved data elements to be in a common data format independent of the data format specific to the first data repository; and responding to the received request by providing the modified data elements of the stored group of data for the one user in the common data format;

transferring the modified data elements of the stored group of data for the one user in the common data format from the first computing system to the second computing system;

receiving at the second computing system the modified data elements of the stored group of data for the one user that are transferred from the first computing system in the common data format; and under control of a storage manager component executing on the second computing system to provide the abstraction interface for the second data repository, receiving a request to store the received data elements of the stored group of data for the one user, the request received via the data storage interface portion of the abstraction interface such that the received request is specified in a manner independent of the second type of the second data repository, so that the transferred data elements of the stored group of data for the one user are stored in the second data repository on the second computing system in a data format specific to the second data repository.

2. The method of claim 1 further comprising:

under control of the storage manager component executing on the second computing system to provide the abstraction interface for the second data repository, modifying the received data elements to be in a data format specific to the second data repository that is distinct from the common data format and from the data format specific to the first data repository; and storing the modified received data elements in the second data repository, the storing being performed in a manner specific to the second data repository.

3. The method of claim 2 further comprising, before the transferring of the stored group of data for the one user to the second computing system, and under control of a node software component of the task exchange system that is executing on the first computing system, using the stored group of data for the one user by:

repeatedly accessing stored data for the one user by obtaining one or more data elements corresponding to the one user, the accessing including sending a request via the data retrieval interface of the abstraction interface of the storage manager component executing on the first computing system, the obtained data elements being provided to the node software component in the common data format; and repeatedly modifying the stored data for the one user by storing one or more data elements corresponding to the one user, the storing including sending a request via a data storage interface of the abstraction interface of the storage manager component executing on the first computing system, the sent request including the one or more data elements provided in the common data format.

4. The method of claim 3 wherein the first type of the first data repository is a relational database, wherein the second type of the second data repository is a type other than a relational database, wherein the one user is a human task performer, and wherein the stored group of data for the one user includes one or more data elements with information about tasks previously performed by the one user, one or more data elements with information about qualifications of the one user, and one or more data elements with information about an account of the one user with the task exchange system.

5. A computer-implemented method for facilitating storage of data on multiple distinct types of data repositories, the method comprising:

receiving an indication to transfer stored data related to an indicated first entity from a first data repository of a first type on a first computing node of a task exchange system to an indicated second data repository of a distinct second type on a second computing node of the task exchange system, the first entity being associated with the task exchange system;

automatically determining a group of multiple data elements related to the first entity that are stored in the first data repository, the multiple data elements being of multiple types and corresponding to multiple aspects of the first entity; and using an abstraction interface to perform the transfer of the stored data related to the indicated first entity, the abstraction interface providing a uniform interface for interacting with multiple data repositories of multiple distinct types and including at least a data retrieval interface portion and a data storage interface portion, the using of the abstraction interface including, retrieving the group of data elements from the first data repository via one or more interactions with the data retrieval interface portion of the abstraction interface, the one or more interactions including one or more first requests specified in a common format that is independent of the first type of the first data repository and independent of the second type of the second data repository; and initiating storage of the retrieved group of data elements in the second data repository via one or more other interactions with the data storage interface portion of the abstraction interface, the one or more other interactions including one or more second requests that are specified in the common format and that initiate providing the retrieved group of data elements in a manner independent of the second type of the second data repository.

6. The method of claim 5 further comprising, before the initiating of the storage of the retrieved group of data elements in the second data repository, transferring the retrieved group of data elements from the first computing node to the second computing node over one or more networks.

7. The method of claim 5 wherein the initiating of the storage of the retrieved group of data elements in the second data repository is performed under control of a node software component executing on the second computing node, and includes sending the one or more second requests to the abstraction interface to store the received transferred group of data elements, the sent one or more second requests including the provided group of data elements.

8. The method of claim 7 wherein the abstraction interface is such that the type of the second data repository is transparent to the node software component.

9. The method of claim 7 wherein the abstraction interface with which the one or more other interactions occur is provided by a storage manager access component executing on the second computing node to provide an interface for the second data repository that is independent of the type of the second data repository.

10. The method of claim 5 wherein the retrieving of the group of data elements from the first data repository is performed under control of a node software component executing on the first computing node, and includes sending the one or more first requests to the abstraction interface.

11. The method of claim 10 wherein the abstraction interface is such that the type of the first data repository is transparent to the node software component.

12. The method of claim 10 wherein the abstraction interface with which the one or more interactions occur is provided by a storage manager access component executing on the first computing node to provide an interface for the first data repository that is independent of the type of the first data repository.

13. The method of claim 5 wherein the data elements stored in the first data repository are in a format specific to the first data repository, and wherein the data elements stored in the second data repository are in a distinct format specific to the second data repository.

14. The method of claim 13 wherein the retrieved data elements are provided via the abstraction interface in a common data format that is independent of the format specific to the first data repository and of the format specific to the second data repository.

15. The method of claim 5 wherein the automatic determining of the group of multiple data elements related to the first entity is performed under control of a node software component executing on the first computing node.

16. The method of claim 5 wherein the multiple data elements related to the first entity include information about multiple other entities to which the first entity is related, and wherein the automatic determining of the group of multiple data elements related to the first entity includes identifying relationships between the first entity and the other entities.

17. The method of claim 5 wherein the first entity is at least one of a task performer user of the task exchange system who performs tasks supplied by others and a task requester user of the task exchange system who supplies tasks to be performed by others, and wherein the multiple data elements related to the first entity include at least one of data elements with information about tasks previously performed by the first entity, data elements with information about tasks previously supplied by the first entity, data elements with information about qualifications of the first entity, and data elements with information about an account of the first entity with the task exchange system.

18. The method of claim 5 wherein the automatic determining of the group of multiple data elements related to the first entity includes using an isolatable entity graph for the first entity to model a state of the first entity.

19. The method of claim 5 wherein the multiple data elements related to the first entity are stored in the first data repository in such a manner as to be independently accessible.

20. The method of claim 5 wherein one of the first and second data repositories is of a relational database type, and wherein the other of the first and second data repositories is of a type other than a relational database.

21. The method of claim 5 wherein the first and second data repositories are distinct versions of a single data repository.

22. The method of claim 5 wherein the first and second computing nodes are a single computing node.

23. The method of claim 5 wherein the first and second data repositories are a subset of multiple alternative data repositories of the task exchange system that are of multiple types, such that each of multiple entities associated with the task exchange system has data related to the entity stored in a single one of the alternative data repositories.

24. The method of claim 23 wherein the multiple types of the multiple data repositories include multiple of a relational database, a key-value pair database, a distributed cache, a database that is compliant with the Java Database Connectivity (JDBC) standard, an object-oriented database, and a flat file database.

25. The method of claim 23 wherein the multiple data repositories are each part of a storage partition provided by one or more of multiple computing nodes associated with the task exchange system.

26. The method of claim 23 wherein the multiple computing nodes are each a distinct computing system.

27. The method of claim 5 further comprising, before the receiving of the indication to transfer the stored data to the indicated second data repository:
repeatedly accessing the stored data for the first entity by retrieving one or more of the multiple data elements from the first data repository via one or more interactions with the abstraction interface; and
repeatedly modifying the stored data for the first entity by storing one or more data elements related to the first entity in the first data repository via one or more interactions with the abstraction interface.

28. The method of claim 5 wherein the method is performed by one or more computing systems that provide the task exchange system so as to facilitate transactions between task performer users able to perform tasks and unaffiliated task requesters having multiple available tasks of multiple types to be performed.

29. A computer-readable storage medium whose contents configure a computing system to facilitate storage of data on multiple distinct types of data repositories, by performing a method comprising:
receiving an indication to transfer stored data related to an indicated first entity from a first data repository of a first type on a first computing node of a task exchange system to an indicated second data repository of a distinct second type on a second computing node of the task exchange system, the first entity being associated with the task exchange system;
automatically determining a group of multiple data elements related to the first entity that are stored in the first data repository, the multiple data elements being of multiple types and corresponding to multiple aspects of the first entity; and using an abstraction interface to perform the transfer of the stored data related to the indicated first entity, the abstraction interface providing a uniform interface for interacting with multiple data repositories of multiple distinct types and including at least a data retrieval interface portion and a data storage interface portion, the using of the abstraction interface including, retrieving the group of data elements from the first data repository via one or more interactions with the data retrieval interface portion of the abstraction interface, the one or more interactions including one or more first requests specified in a common format that is independent of the first type of the first data repository and independent of the second type of the second data repository; and initiating storage of the retrieved group of data elements in the second data repository via one or more other interactions with the data storage interface portion of the abstraction interface, the one or more other interactions including one or more second requests that are specified in the common format and that initiate providing the retrieved group of data elements in a manner independent of the second type of the second data repository.

30. The computer-readable storage medium of claim 29 wherein the initiating of the storage of the retrieved group of data elements in the second data repository is performed under control of a node software component executing on the second computing node, and includes sending the one or more second requests to the abstraction interface to store the received transferred group of data elements, the sent one or more second requests including the provided group of data elements.

31. The computer-readable storage medium of claim 29 wherein the retrieving of the group of data elements from the first data repository is performed under control of a node software component executing on the first computing node, and includes sending the one or more first requests to the abstraction interface.

32. The computer-readable storage medium of claim 29 wherein the data elements stored in the first data repository are in a format specific to the first data repository, and wherein the data elements stored in the second data repository are in a distinct format specific to the second data repository.

33. The computer-readable storage medium of claim 32 wherein the retrieved data elements are provided via the abstraction interface in a common data format that is independent of the format specific to the first data repository and of the format specific to the second data repository.

34. The computer-readable storage medium of claim 29 wherein the multiple data elements related to the first entity include information about multiple other entities to which the first entity is related, and wherein the automatic determining of the group of multiple data elements related to the first entity includes identifying relationships between the first entity and the other entities.

35. The computer-readable storage medium of claim 29 wherein the first entity is at least one of a task performer user of the task exchange system who performs tasks supplied by others and a task requester user of the task exchange system who supplies tasks to be performed by others, and wherein the multiple data elements related to the first entity include at least one of data elements with information about tasks previously performed by the first entity, data elements with information about tasks previously supplied by the first entity, data elements with information about qualifications of the first entity, and data elements with information about an account of the first entity with the task exchange system.

36. The computer-readable storage medium of claim 29 wherein one of the first and second data repositories is of a relational database type, and wherein the other of the first and second data repositories is of a type other than a relational database.

37. The computer-readable storage medium of claim 29 wherein the first and second data repositories are distinct versions of a single data repository, and wherein the first and second computing nodes are a single computing node.

38. The computer-readable storage medium of claim 29 wherein the first and second data repositories are a subset of multiple alternative data repositories of the task exchange system that are of multiple types, such that each of multiple entities associated with the task exchange system has data related to the entity stored in a single one of the alternative data repositories.

39. The computer-readable storage medium of claim 38 wherein the multiple types of the multiple data repositories include multiple of a relational database, a key-value pair database, a distributed cache, a database that is compliant with the Java Database Connectivity (JDBC) standard, an object-oriented database, and a flat file database.

40. The computer-readable storage medium of claim 29 wherein the computer-readable storage medium is a memory of the computing system, and wherein the contents are instructions that when executed cause the computing system to perform the method.

41. A computing system configured to facilitate storage of data on multiple distinct types of data repositories, comprising:

one or more processors, and one or more components that are configured to, when executed by at least one of the one or more processors:

receive an indication to transfer the stored data related to the indicated first entity from a first data repository of a first type on a first computing node of a task exchange system to an indicated second data repository of a distinct second type on a second computing node of the task exchange system, the first entity being associated with the task exchange system;

automatically determine a group of multiple data elements related to the first entity that are stored in the first data repository, the multiple data elements being of multiple types and corresponding to multiple aspects of the first entity; and use an abstraction interface to perform the transfer of the stored data related to the indicated first entity, the abstraction interface providing a uniform interface for interacting with multiple data repositories of multiple distinct types and including at least a data retrieval interface portion and a data storage interface portion, the use of the abstraction interface including, retrieving the group of data elements from the first data repository via one or more interactions with the data retrieval interface portion of the abstraction interface, the one or more interactions including one or more first requests specified in a common format that is independent of the first type of the first data repository and independent of the second type of the second data repository; and initiating storage of the retrieved group of data elements in the second data repository via one or more other interactions with the data storage interface portion of the abstraction interface, the one or more other interactions including one or more second requests that are specified in the common format and that initiate providing the retrieved group of data elements in a manner independent of the second type of the second data repository.

42. The computing system of claim 41 wherein the initiating of the storage of the retrieved group of data elements in the second data repository is performed under control of a node software component executing on the second computing node, and includes sending the one or more second requests to the abstraction interface to store the received transferred group of data elements, the sent one or more second requests including the provided group of data elements.

43. The computing system of claim 41 wherein the retrieving of the group of data elements from the first data repository is performed under control of a node software component executing on the first computing node, and includes sending the one or more first requests to the abstraction interface.

44. The computing system of claim 41 wherein the data elements stored in the first data repository are in a format specific to the first data repository, and wherein the data elements stored in the second data repository are in a distinct format specific to the second data repository.

45. The computing system of claim 44 wherein the retrieved data elements are provided via the abstraction interface in a common data format that is independent of the format specific to the first data repository and of the format specific to the second data repository.

46. The computing system of claim 41 wherein the multiple data elements related to the first entity include information about multiple other entities to which the first entity is related, and wherein the automatic determining of the group of multiple data elements related to the first entity includes identifying relationships between the first entity and the other entities.

47. The computing system of claim 41 wherein the first entity is at least one of a task performer user of the task exchange system who performs tasks supplied by others and a task requester user of the task exchange system who supplies tasks to be performed by others, and wherein the multiple data elements related to the first entity include at least one of data elements with information about tasks previously performed by the first entity, data elements with information about tasks previously supplied by the first entity, data elements with information about qualifications of the first entity, and data elements with information about an account of the first entity with the task exchange system.

48. The computing system of claim 41 wherein one of the first and second data repositories is of a relational database type, and wherein the other of the first and second data repositories is of a type other than a relational database.

49. The computing system of claim 41 wherein the first and second data repositories are distinct versions of a single data repository, and wherein the first and second computing nodes are a single computing node.

50. The computing system of claim 41 wherein the first and second data repositories are a subset of multiple alternative data repositories of the task exchange system that are of multiple types, such that each of multiple entities associated with the task exchange system has data related to the entity stored in a single one of the alternative data repositories.

51. The computing system of claim 50 wherein the multiple types of the multiple data repositories include multiple of a relational database, a key-value pair database, a distributed cache, a database that is compliant with the Java Database Connectivity (JDBC) standard, an object-oriented database, and a flat file database.

52. The computing system of claim 41 wherein the one or more components are part of a task exchange system and each includes software instructions for execution by the computing system.

* * * * *